US008527859B2

(12) United States Patent
Henshall et al.

(10) Patent No.: US 8,527,859 B2
(45) Date of Patent: Sep. 3, 2013

(54) DYNAMIC AUDIO PLAYBACK OF SOUNDTRACKS FOR ELECTRONIC VISUAL WORKS

(75) Inventors: William Henshall, Los Angeles, CA (US); Graham Lyus, San Francisco, CA (US)

(73) Assignee: Dulcetta, Inc., Los Angeles, CA (US)

( * ) Notice: Subject to any disclaimer, the term of this patent is extended or adjusted under 35 U.S.C. 154(b) by 315 days.

(21) Appl. No.: 12/943,917

(22) Filed: Nov. 10, 2010

(65) Prior Publication Data

US 2011/0195388 A1   Aug. 11, 2011

Related U.S. Application Data

(60) Provisional application No. 61/259,995, filed on Nov. 10, 2009.

(51) Int. Cl.
*G06F 17/00* (2006.01)
(52) U.S. Cl.
USPC ........................................................ 715/204
(58) Field of Classification Search
USPC ........................................ 715/203, 204, 241
See application file for complete search history.

(56) References Cited

U.S. PATENT DOCUMENTS

| | | | | |
|---|---|---|---|---|
| 6,424,996 | B1 * | 7/2002 | Killcommons et al. | 709/206 |
| 6,598,074 | B1 * | 7/2003 | Moller et al. | 709/204 |
| 2007/0183753 | A1 * | 8/2007 | Kanno | 386/96 |
| 2008/0120342 | A1 * | 5/2008 | Reed et al. | 707/104.1 |
| 2009/0191531 | A1 * | 7/2009 | Saccocci et al. | 434/317 |
| 2010/0149933 | A1 * | 6/2010 | Cervera Navas | 369/47.1 |
| 2010/0240416 | A1 * | 9/2010 | Knight | 455/566 |
| 2010/0288106 | A1 * | 11/2010 | Sherwani et al. | 84/609 |
| 2010/0332225 | A1 * | 12/2010 | Arrowood et al. | 704/235 |
| 2011/0016004 | A1 * | 1/2011 | Loyall et al. | 705/14.72 |
| 2011/0167390 | A1 * | 7/2011 | Reed et al. | 715/854 |
| 2011/0195388 | A1 * | 8/2011 | Henshall et al. | 434/317 |
| 2012/0210203 | A1 * | 8/2012 | Kandekar et al. | 715/230 |

FOREIGN PATENT DOCUMENTS

| WO | WO 2009/024626 A1 | 2/2009 |
|---|---|---|
| WO | WO 2010002275 A2 | 1/2010 |

OTHER PUBLICATIONS

PCT International Searching Authority, "Transmittal of the International Search Report and the Written Opinion of the International Searching Authority" for PCT/US2010/056281, May 2, 2011, 13 pp.

* cited by examiner

*Primary Examiner* — Laurie Ries
(74) *Attorney, Agent, or Firm* — Stephen J. Shaw; Brokaw Patent Law PC

(57) ABSTRACT

An electronic book is provided with a soundtrack, to which a reader can listen while reading the electronic book. The soundtrack accompanies and enhances the reading experience, in which readers generally have images in their minds based on the story or other visual media that is part of the electronic book. Playback of the soundtrack is synchronized with the visual display of the electronic book. Audio cues are associated with different points in the text and these cues are dynamically played back in synchronization with the visual display of the electronic book based on the interaction of the user with the electronic book. The dynamic playback involves editing and playing an audio cue so that it has a duration that is based on a prediction of the duration of the portion of the electronic book with which the cue is synchronized. When the system starts playing an audio cue, it predicts when the next audio cue should start. The current cue is played for predicted duration and a transition to the next audio cue is initiated at an appropriate time.

30 Claims, 8 Drawing Sheets

DYNAMIC AUDIO PLAYBACK OF SOUNDTRACKS FOR ELECTRONIC VISUAL WORKS

CROSS-REFERENCE TO RELATED APPLICATIONS

This application is a nonprovisional application claiming priority to, and the benefits of, under 35 U.S.C. §119, U.S. provisional patent application Ser. No. 61/259,995, filed on Nov. 10, 2009, which is hereby incorporated by reference.

BACKGROUND

Electronic books are a kind of multimedia work that is primarily comprised of text, but also may include other visual media such as graphics and images. While text in an electronic book may be accompanied by other visual media, generally an electronic book is intended to be read from start to finish, although not necessarily in one sitting.

There are several file formats used for electronic books, including but not limited to various types of markup language document types (e.g., SGML, HTML, XML, LaTex and the like), and other data file types, such as .pdf files, plain text files, etc. Various file formats are used with electronic book readers, such as the KINDLE reader from Amazon.com. Such a book reader generally is a computer program designed to run on a platform such as a personal computer, notebook computer, laptop computer, tablet computer, mobile device or dedicated hardware system for reading electronic books (such as the KINDLE reader).

SUMMARY

An electronic book is provided with a soundtrack, to which a reader can listen while reading the electronic book. The purpose of the soundtrack is to accompany and enhance the reading experience, in which readers generally have images in their minds based on the story or other visual media that is part of the electronic book. Playback of the soundtrack is synchronized with the visual display of the electronic book.

Synchronizing playback of a soundtrack to the visual display of an electronic book while the book is read by a reader is a challenging problem. Different individuals read at different speeds, and different individuals will read at different speeds at different times. The duration of the visual display of a portion of the electronic book varies in duration from reader to reader, and between different points in time. In other words, the duration of the visual display of the portion of an electronic book is variable, depending on the user interaction with the electronic book. Yet the playback of the soundtrack, a kind of time-dependent media, is synchronized with this visual display.

To provide a good reading experience with a soundtrack in a manner that is applicable to multiple readers, audio cues are associated with different points in the text and these cues are dynamically played back in synchronization with the visual display of the electronic book based on the interaction of the user with the electronic book. The dynamic playback involves editing and playing an audio cue so that it has a duration that is based on a prediction of the duration of the portion of the electronic book with which the cue is synchronized. When the system starts playing an audio cue, it predicts when the next audio cue should start. The current cue is played for predicted duration and a transition to the next audio cue is initiated at an appropriate time.

Such a soundtrack generally is not just any music or sound; some music and sound could be distracting to the reader instead of enhancing the reading experience. Instead, the soundtrack includes music and sound designed to evoke emotions in the reader similar to those emotions that would be evoked by the text. Generally, a soundtrack for an electronic book benefits when there are few bright transient sounds, no vocals, and a spare, somewhat hypnotic feel to the music. Genre-wise, music that is too fast or too intense can be distracting and difficult to read to.

In its various aspects, the invention can be embodied in a computer-implemented process, a machine (such as an electronic device, or a general purpose computer or other device that provides a platform on which computer programs can be executed), processes performed by these machines, or an article of manufacture. Such articles can include a computer program product or digital information product in which a computer readable storage medium containing computer program instructions or computer readable data stored thereon, and processes and machines that create and use these articles of manufacture.

Accordingly, in one aspect, dynamic playback of audio involves receiving data about user interaction with a portion of an electronic visual work. A section of audio to be played back associated with the portion of the electronic visual work is dynamically adjusted in length according to the user interaction with the electronic visual work. In one implementation, the duration of the visual display of the portion of the electronic visual work is estimated according to the received data about user interaction with the portion of the electronic visual work. A sequence of sub-mixes of audio associated with the portion of the electronic visual work is selected so as to provide audio elements that will match the estimated duration. This estimation can be done using a history of reading speeds.

In another aspect, a soundtrack is played in synchronization with display of an electronic visual work. The electronic visual work is received into memory. Information associating portions of the electronic visual work with tags also is received into memory. Portions of the electronic visual work are displayed in response to user interaction. Audio files with tags are accessed. Audio files to be associated with portions of the electronic visual work are selected according to the tags associated with the portions of the electronic visual work. Data about user interaction with the portion of an electronic visual work is received and the duration of playback of audio associated with that specific portion of the electronic visual work is dynamically adjusted according to the user interaction.

In another aspect, a soundtrack for an electronic visual work is generated. The electronic visual work is received into memory. The electronic visual work is processed in the memory such that portions of the electronic visual work are marked with tags that will associate to specific portions of tagged audio files. Audio files with the appropriate tags are then accessed, and the target audio files for portions of the electronic visual work are selected and associated to create and play back the resulting soundtrack. The electronic visual work can includes text and the processing includes processing the text. The tags can include emotional descriptors.

In another aspect, a cue list includes for each portion of an electronic visual work, an emotional descriptor, wherein the emotional descriptors correspond to emotional descriptors also associated with audio data.

In another aspect, an audio cue includes audio data for a plurality of submixes of the musical work (called "stems") that can be mixed to provide audio data and information indicative of how the stems can be repeated and combined to create the final result heard by the reader.

In another aspect, distribution of a soundtrack and its associated electronic visual work is done in a manner that enables the electronic visual work to be viewed in the same manner as if the soundtrack was not available. After a reader accesses an electronic visual work, a cue list is identified and read. As a background task, audio data is downloaded while a first cue in the soundtrack is played in synchronization with the display of the electronic visual work.

Yet other aspects are set forth in the following detailed description, and are provided by the various combinations of these different aspects of the invention.

DETAILED DESCRIPTION

In the following description, specific details are given to provide a thorough understanding of the embodiments. However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc., in a computer program. When a process corresponds to a function, its termination corresponds to a return of the function to the calling function or a main function.

Aspects of the systems and methods described below may be operable on any type of general purpose computer system or computing device, including, but not limited to, a desktop, laptop, notebook, tablet or mobile device. The term "mobile device" includes, but is not limited to, a wireless device, a mobile phone, a mobile communication device, a user communication device, personal digital assistant, mobile handheld computer, a laptop computer, an electronic book reader and reading devices capable of reading electronic contents and/or other types of mobile devices typically carried by individuals and/or having some form of communication capabilities (e.g., wireless, infrared, short-range radio, etc.).

Figure 9:
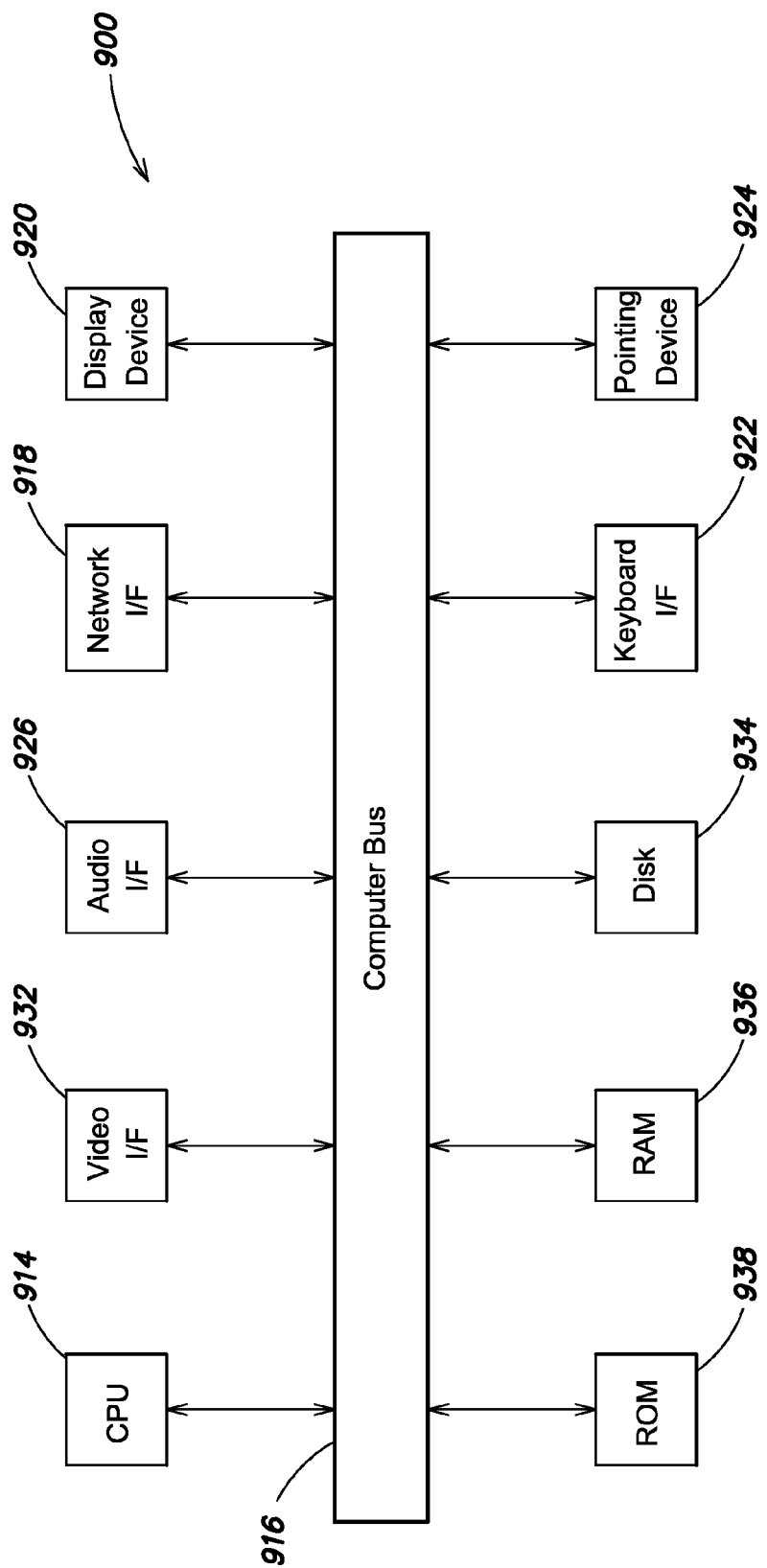
FIG. 9 is a block diagram of a computer system.

FIG. 9 is a block diagram illustrating the internal functional architecture of a computer system 900 usable with one or more aspects of the systems and methods described in further detail below. As shown in FIG. 9, the computer system 900 may include a central processing unit (CPU) 914 for executing computer-executable process steps and interfaces with a computer bus 916. Also shown in FIG. 9 are a network interface 918, a display device interface 920, a keyboard or input interface 922, a pointing device interface 924, an audio interface 926, a video interface 932, and a hard disk drive 934 or other persistent storage.

As described above, the disk 934 may store operating system program files, application program files, web browsers, and other files. Some of these files may be stored on the disk 934 using an installation program. For example, the CPU 914 may execute computer-executable process steps of an installation program so that the CPU 914 can properly execute the application program.

A random access main memory ("RAM") 936 may also interface to the computer bus 916 to provide the CPU 914 with access to memory storage. When executing stored computer-executable process steps from the disk 934, the CPU 914 stores and executes the process steps out of the RAM 936. Data to be processed also can be read from such memory 936 or storage 934, and stored in such memory 936 or storage 934. Read only memory ("ROM") 938 may be provided to store invariant instruction sequences such as start-up instruction sequences or basic input/output operating system (BIOS) sequences for operation of the keyboard 922.

An electronic book reader, or other application for providing visual displays of electronic books and other multimedia works, can be implemented on a platform such as described in FIG. 9.

In the following description an electronic book and an electronic book reader are used as examples of the kind of multimedia work and corresponding viewer with which playback of a soundtrack can be synchronized. Other kinds of multimedia works in which the duration of the visual display of a portion of the work is dependent on user interaction with the work also can use this kind of synchronization. The term electronic book is intended to encompass books, magazines, newsletters, newspapers, periodicals, maps, articles, and other works that are primarily text or text with accompanying graphics or other visual media.

Soundtracks can be associated with any of a variety of electronic visual works, including electronic books. The types of music or audio that could be used also likely would depend on the type of work. For example, for works of fiction, the soundtrack will be similar in purpose to a movie soundtrack, i.e., to support the story—creating suspense, underpinning a love interest, or reaching a big climax. For children's book, the music may be similar to that used for cartoons, possibly including more sound effects, such as for when a page is being turned. For textbooks, the soundtrack may include rhythms and tonalities known to enhance knowledge retention, such as material at about 128 or 132 beats per minute and using significant modal tonalities. Some books designed to support meditation could have a soundtrack with sounds of nature, ambient sparse music, instruments with soft tones, and the like. Travel books could have music and sounds that are native to the locations being described. For magazines and newspapers, different sections or articles could be provided with different soundtracks and/or with different styles of music. Even reading different passes of the same page could have different soundtracks. Advertisers also could have their audio themes played during reading of such works. In such cases, the soundtracks could be selected in a manner similar to how text based advertisements are selected to accompany other material.

Figure 1:
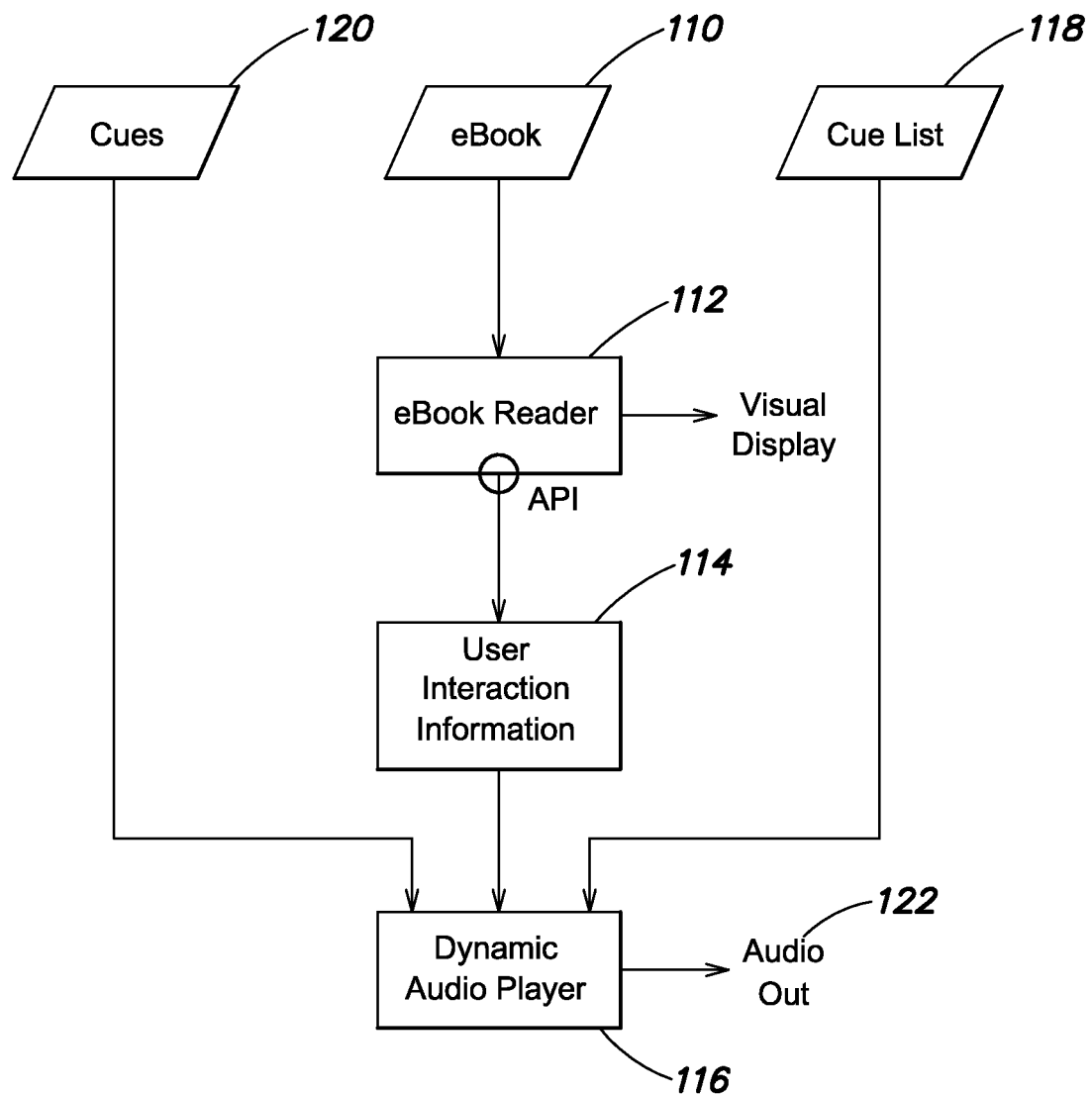
FIG. 1 is a dataflow diagram of an electronic book reader with a dynamic audio player.

In particular, referring now to FIG. 1, an electronic book 110 is input to an electronic book reader 112, which provides a visual display of the electronic book to an end user or reader. The electronic book 110 is one or more computer data files that contain at least text and are in a file format designed to enable a computer program to read, format and display the text. There are various file formats for electronic books, including but not limited to various types of markup language document types (e.g., SGML, HTML, XML, LaTex and the like), and other document types, examples of which include, but are not limited to, EPUB, FictionBook, plucker, PalmDoc, zTxt, TCR, CHM, RTF, OEB, PDF, mobipocket, Calibre, Stanza, and plain-text. Some file formats are proprietary and are designed to be used with dedicated electronic book readers. The invention is not limited to any particular file format.

The electronic book reader 112 can be any computer program designed to run on a computer platform, such as described above in connection with FIG. 9, examples of which include, but are not limited to, a personal computer, tablet computer, mobile device or dedicated hardware system for reading electronic books and that receives and displays the contents of the electronic book 110. There are a number of commercially or publicly available electronic book readers, examples of which include, but are not limited to, the KINDLE reader from Amazon.com, the Nook reader from Barnes & Noble, the Stanza reader, and the FBReader software, an open source project. However, the invention is not limited to any particular electronic book reader.

The electronic book reader 112 also outputs data 114 indicative of the user interaction with the electronic book reader 112, so that such data can be used by a dynamic audio player 116. Commercially or publicly available electronic book readers can be modified in accordance with the description herein to provide such outputs.

The data about the user interaction with the text can come in a variety of forms. For example, an identifier of the book being read (such as an ISBN, e-ISBN number or hash code), and the current position in the text can be provided. Generally, the current position is tracked by the electronic book reader as the current "page" or portion of the electronic book that is being displayed. The electronic book reader can output this information when it changes. Other information that can be useful, if provided by the electronic book reader 112, includes, but is not limited to the word count for a current range of the document being display, an indication of when the user has exited the electronic book reader application, and an indication of whether the reader has paused reading or resumed reading after a pause.

The information and instructions exchanged between the electronic book reader and the dynamic audio player can be implemented through an application programming interface (API), so that the dynamic audio player can request that the electronic book reader provide status information, or perform some action, or so that the electronic book reader can control the other application program. The dynamic audio player can be programmed to implement this API as well. An example implementation of the API includes, but is not limited to, two interfaces, one for calls from the electronic book reader application, and another for calls to the electronic book reader application.

Example calls that the electronic book reader can make to the dynamic audio player include:

"ebookOpenedwithUniqueID"—This function is called by the electronic book reader when the application opens an electronic book. This function has parameters that specify the electronic book's unique identifier and whether the electronic book has been opened before. In response to this information the dynamic audio player sets the current cue. The first time an electronic book is opened, the current position will be set to the start of the first cue.

"ebookClosed"—This function is called by the electronic book reader when the application closes an electronic book. In response to this call, the dynamic audio player can free up memory and reset internal data.

"ebookRemoved"—This function is called when the electronic book reader has removed an ebook from its library, so that soundtrack and audio files also can also be removed.

"displayedPositionRangeChanged"—This function is called when the electronic book reader changes its display, for example, due to a page turn, orientation change, font change or the like, and provides parameters for the range of the work that is newly displayed. In response to this call the dynamic audio player can set up audio cues for the newly displayed range of the work.

"readingResumed"—This function is called when the user has resumed reading after an extended period of inactivity, which the electronic book reader detects by receiving any of a variety of inputs from the user (such as a page turn command) after reading has been determined to be "paused."

"fetchSoundtrack"—This function is called by the electronic book reader to instruct the dynamic audio player to fetch and import the soundtrack file, or cue list, for the electronic book with a specified unique identifier (provided as a parameter of this function).

"audioVolume"—This function is called by the electronic book reader to instruct the dynamic audio player to set the volume of the audio playback.

"getCueLists"—This function is called by the electronic book reader to retrieve information from the dynamic audio player about the cue lists and groups available for the currently opened electronic book. This function would allow the electronic book reader to present this information to the reader, for example.

"cueListEnabled"—This function is called by the electronic book reader to instruct the dynamic audio player to enable or disable a particular cue list, e.g., an alternative soundtrack, sound effects, a recorded reader or text-to-speech conversion.

"audioIntensity"—This function is called by the electronic book reader to instruct the dynamic audio player to set the intensity of the audio playback, e.g., to make the audio composition quieter or mute a drum stem (submix).

"audioPreloadDefault"—This function is called to set a default number of hours of audio to download and keep on hand generally for electronic books.

"audioPreloadForEbook"—This function is called to set a number of hours of audio to download and keep for a specific ebook.

"downloadEnabled"—This function is called to enable or disable audio downloading.

Example calls that the dynamic audio player can make to the electronic book reader include:

"readingPaused"—This function is called by the dynamic audio player if it has not received a "displayedPositionRangeChanged" call from the electronic book reader within an expected time. From this information, it is assumed by the dynamic audio player that the user is no longer reading. After calling this function, the electronic book reader should call the "readingResumed" function when the user starts reading again.

"gotoPosition"—This function is called by the dynamic audio player to instruct the electronic book reader to set the current position in the book, usually at the start point of the first cue the first time the electronic book is opened in response to the "ebookOpenedAtPath" function being called.

"wordCountForRange"—This function is called by the dynamic audio player to instruct the electronic book reader to provide a number of words for a specified range of the electronic book, to be used in scheduling playlists and tracking reading speed as described in more detail below.

The use of these API calls is described in more detail below.

The electronic book 110 has an associated cue list 118, described in more detail below in connection with FIG. 3, which associates portions of the text with audio cues 120. In general, an identifier used to uniquely identify the electronic book 110 is used to associate the cue list 118 to the book by either embedding the identifier in the cue list or having a form of lookup table or map that associates the identifier of the book with the cue list 118. An audio cue 120 is a computer data file that includes audio data. In general, an audio cue 120 associated with a portion of the text by the cue list 118 is played back while the reader is reading that portion of the text. For example, a portion of the text may be designated by a point in the text around which the audio cue should start playing, or a range in the text during which the audio cue should play. The dynamic audio player 116 determines when and how to stop playing one audio cue and start playing another.

The dynamic audio player 116 receives data 114 about the user interaction with the electronic book reader 112, as well as cues 120 and the cue list 118. As will be described in more detail below, the dynamic audio player 116 uses the user interaction data 114 and the cue list 118 to select the audio cues 120 to be played, and when and how to play them, to provide an output audio signal 122.

During playback of the soundtrack, the dynamic audio player plays a current cue, associated with the portion of the text currently being read, and determines how and when to transition the next cue to be played, based on the data about the user interaction with the text. As shown in more detail in FIG. 2, the dynamic audio player 200 thus uses a current cue 204 and a next cue 210 to generate audio 206. The cues 204 and 210 to be played are determined through a cue lookup 208, using the data 212 about the user interaction, and the cue list 202. While the dynamic audio player is playing the current cue 204, it monitors the incoming data 212 to determine when the next cue should be played. The current cue 204 may need to be played for a longer or shorter time than the cue's actual duration. As described in more detail below, the dynamic audio player lengthens or shortens the current cue so as to fit the amount of time the user is taking to read the associated portion of the text, and then implements a transition, such as a cross fade, at the estimated time at which the user reaches the text associated with the next cue.

Figure 2:
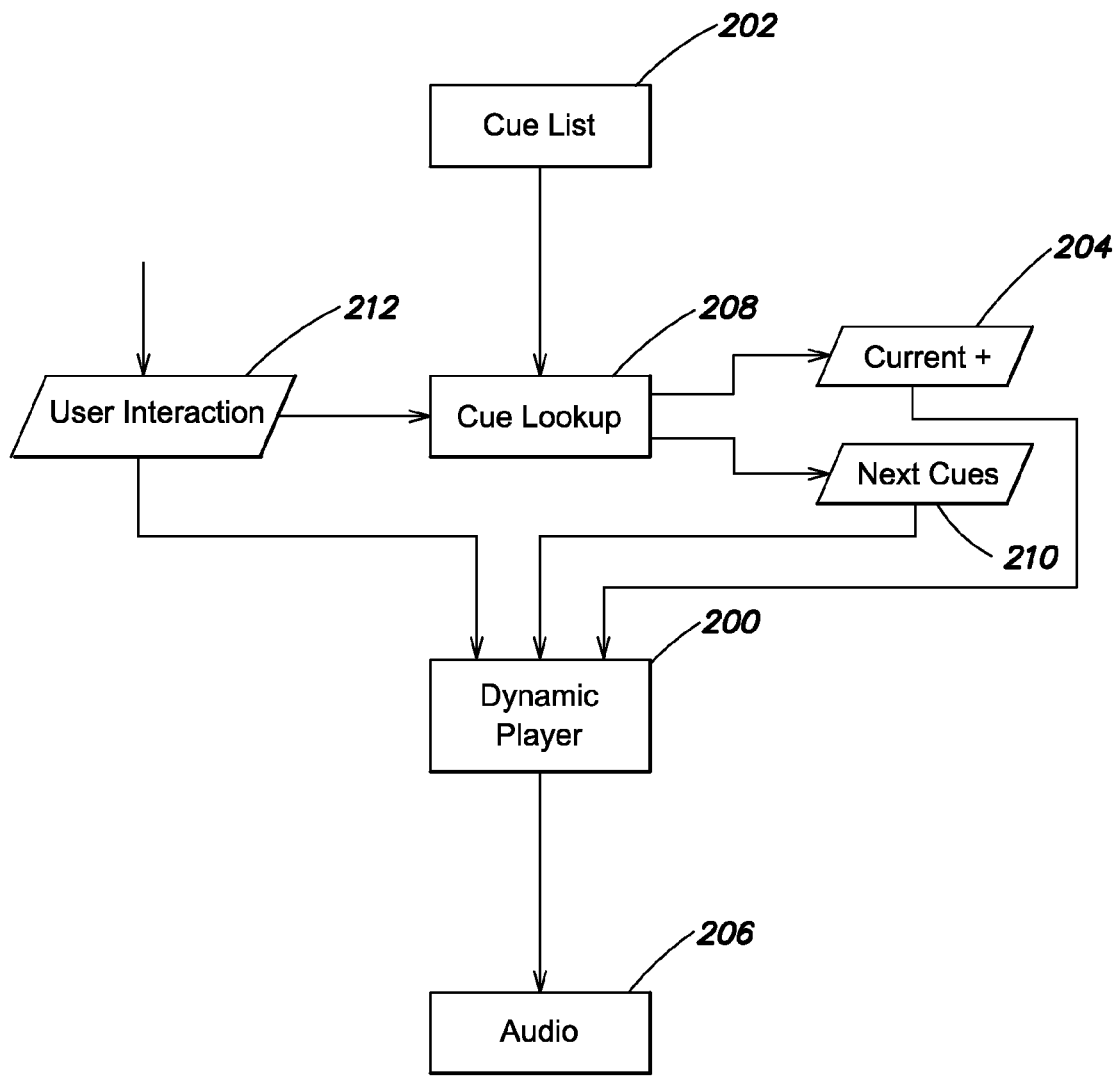
FIG. 2 is a dataflow diagram of more details of the dynamic audio player of FIG. 1.
Figure 3:
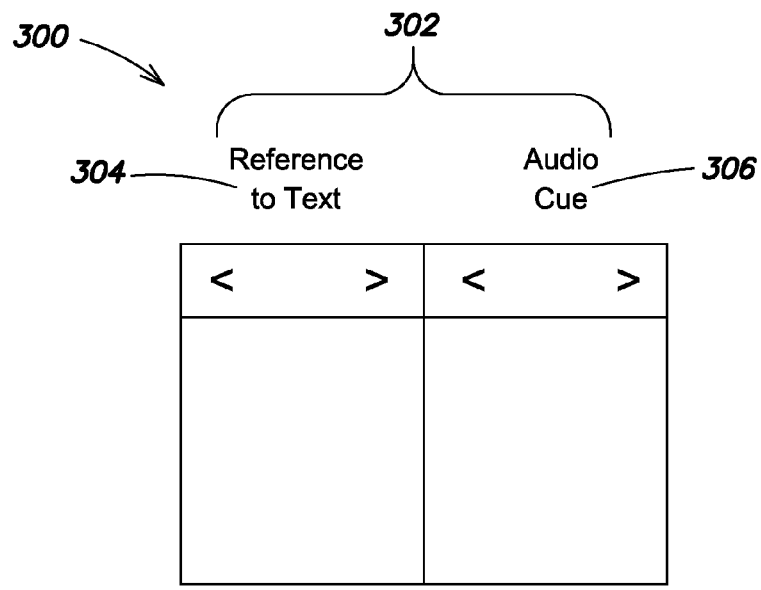
FIG. 3 is an illustration of a cue list.

Referring now to FIG. 3, an example implementation of the cue list 118 of FIG. 1 will now be described in more detail. Audio cues, e.g., 120 in FIGS. 1 and 204, 210 in FIG. 2, are assigned to portions of the text. This assignment can be done using a meta-tag information file that associates portions of the text with audio files. The association with an audio file may be direct or indirect, and may be statically or dynamically defined. For example, different portions of the text can be assigned different words or other labels indicative of emotions, moods or styles of music to be associated with those portions of the text. Audio files then can be associated with such words or labels. The audio files can be selected and statically associated with the text, or they can be selected dynamically at the time of playback, as described in more detail below. Alternatively, different points in the text may be associated directly with an audio file.

An example meta-tag information file is shown in FIG. 3. The meta-tag information file is a list 300 of pairs 302 of data representing a cue. Each pair 302 representing a cue includes a reference 304 to the text, such as a reference to a markup language element within a text document, an offset from the beginning of a text document, or a range within a text document. The pair 302 also includes data 306 that specifies the cue. This data may be a word or label, such as an emotive tag, or an indication of an audio file, such as a file name, or any other data that may be used to select an audio file. How a composer or a computer program can create such cue lists will be described in more detail below.

The meta-tag information file can be implemented as a file that is an archive containing several metadata files. These files can be in JavaScript Object Notation (JSON) format. The meta-tag information file can include a manifest file that contains general information about the soundtrack, such as the unique identifier of the electronic book with which it is associated, the title of the electronic book, a schema version, (for compatibility purposed, in case the format changes in the future), and a list of other files in the archive, with checksums for integrity checking. In addition to the manifest file, the meta-tag information file also includes a cuelists file which contains the list of cue list descriptors available in the soundtrack. Each cue list descriptor includes a display name, a unique identifier for lookup purposes and an optional group name of the cue list. As an example, there may be several mutually exclusive main cue lists, from which it only makes sense to have a single one playing. These cue lists might have a group name of "main," whereas with a sound effects or "read to me" cue list it would be ok to play them all at that same time, and thus would not utilize the group name.

The meta-tag information file also includes a cues file that contains the list of cue descriptors for all of the cue lists. Each cue descriptor includes a descriptive name given to the cue descriptor by a producer. This descriptor could be entered using another application for this purpose, and could include information such as a cue file name that is used to look up the location of the cue file in the list of cue files, and in and out points in the electronic book.

Finally, the meta-tag information file includes a "cuefiles" file that contains the list of cue file descriptors. The cuefiles file specifies the network location of the cue files. Each cue file descriptor includes a descriptive name given to the cuefile by a producer and used as the cue file name in the cue descriptor, a uniform resource locator (URL) for retrieving the cue file and the original file name of the cue file.

Figure 4:
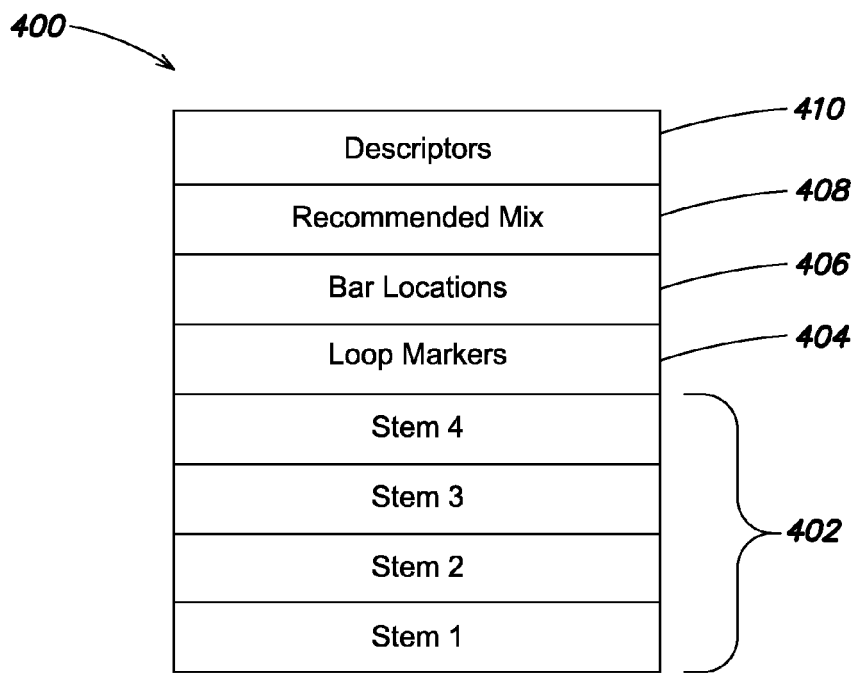
FIG. 4 is an illustration of an audio cue file.

The audio cues (120 in FIG. 1) referred to in such a cue list contain audio data, which may be stored in audio file formats, such as AIFF, MP3, AAC, m4a or other file types. Referring now to FIG. 4, an example implementation of an audio cue file will be described. An audio cue file 400 can include multiple "stems" (submixes) 402, each of which is a separate audio file that provides one part of a multipart audio mix for the cue. The use of such stems allows the dynamic audio player to select from among the stems to repeat in order to lengthen the playback time of the cue. An audio cue file also can include information that is helpful to the dynamic audio player to modify the duration for which the audio cue is played, such as loop markers 404, bar locations 406 and recommended mix information 408. The recommended mix information includes a list of instructions for combining the audio stems, where each instruction indicates the stems and sections to be used, and any audio effects processing to be applied. Other information such as a word or label indicative of the emotion or mood intended to be evoked by the audio or data indicative of genre, style, instruments, emotion, atmosphere, place, era—called descriptors 410—also can be provided. Even more additional information, such as alternative keywords, cue volume, cross-fade or fade-in/out shape/intensity and recommended harmonic progression for successive cues also can be included.

As an example, the audio cue file can be implemented as an archive containing a metadata file in JSON format and one or more audio files for stems of the cue. The metadata file contains a descriptor for the metadata associated with the audio files, which includes bar locations, loop markers, recommended mix information, emodes (emotional content metatags), audio dynamics control metadata (dynamic range compression), instruments, atmospheres and genres. The audio files can include data compressed audio files and high resolution original audio files for each stem. Retaining the high resolution versions of each stem supports later editing using music production tools. A copy of the audio cue files without the original audio files can be made to provide for smaller downloads to electronic book readers. The cue file contains the compressed audio files for the stems, which are the files used for playback in the end user applications.

The cue files can be created using a software tool that inputs a set of standard audio stems, adds descriptor, loop point and recommended mix meta information as a separate text file, optimizes and compresses the audio for network delivery and outputs a single package file that can be uploaded to a database. An audio file can be analyzed using various analytic techniques to locate sections, beats, loudness information, fades, loop points and the link. Cues can be selected using the descriptors "genre, style, instruments, emotion, place, era" and delivered over the network as they are used by the reader.

The cue lists and cue files can be individually encrypted and linked to a specific work for which they are the soundtrack. The same key would be used to access the work and its soundtrack. Thus files could be tied to the specific work or the specific viewing device through which the work was accessed, and can use digital rights management information associated with the work.

Figure 5:
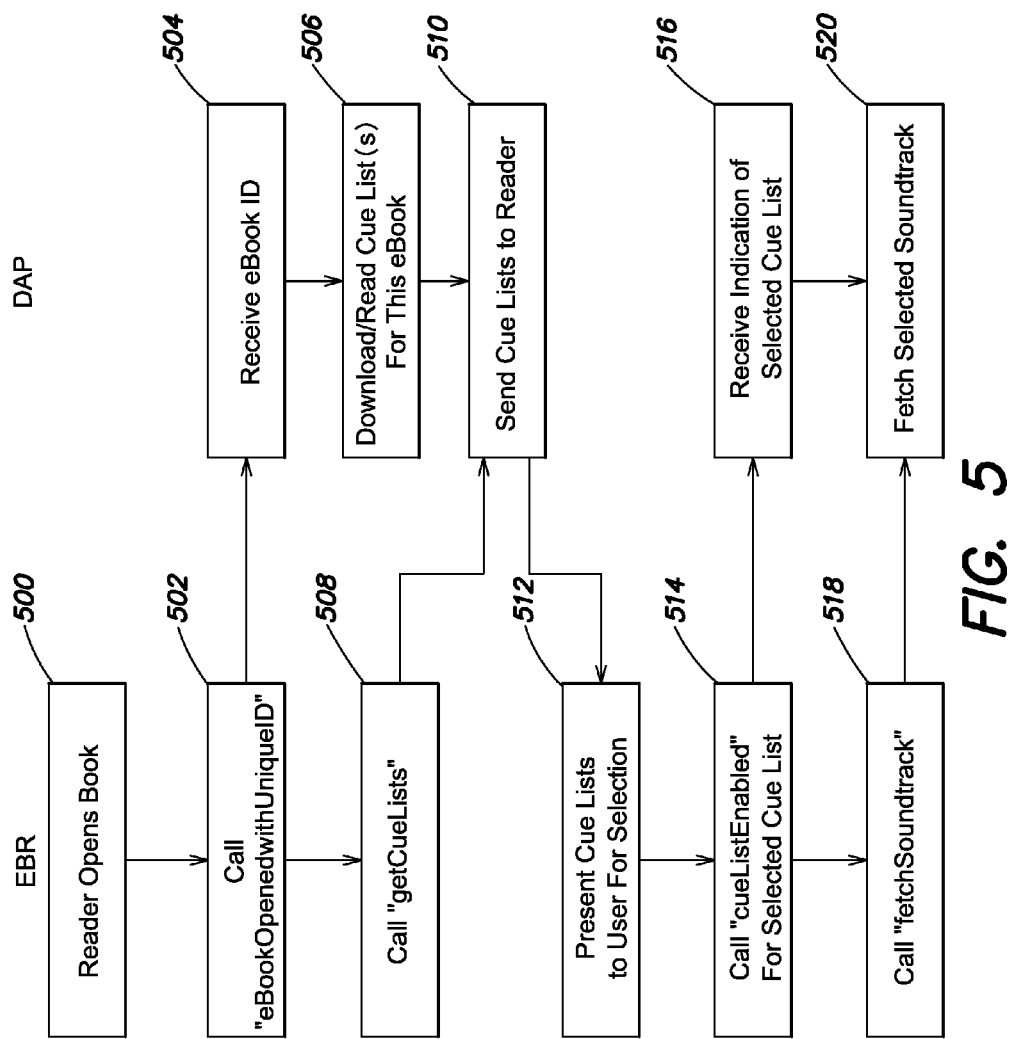
FIG. 5 is a flow chart of the setup process when an electronic book is opened.
Figure 6:
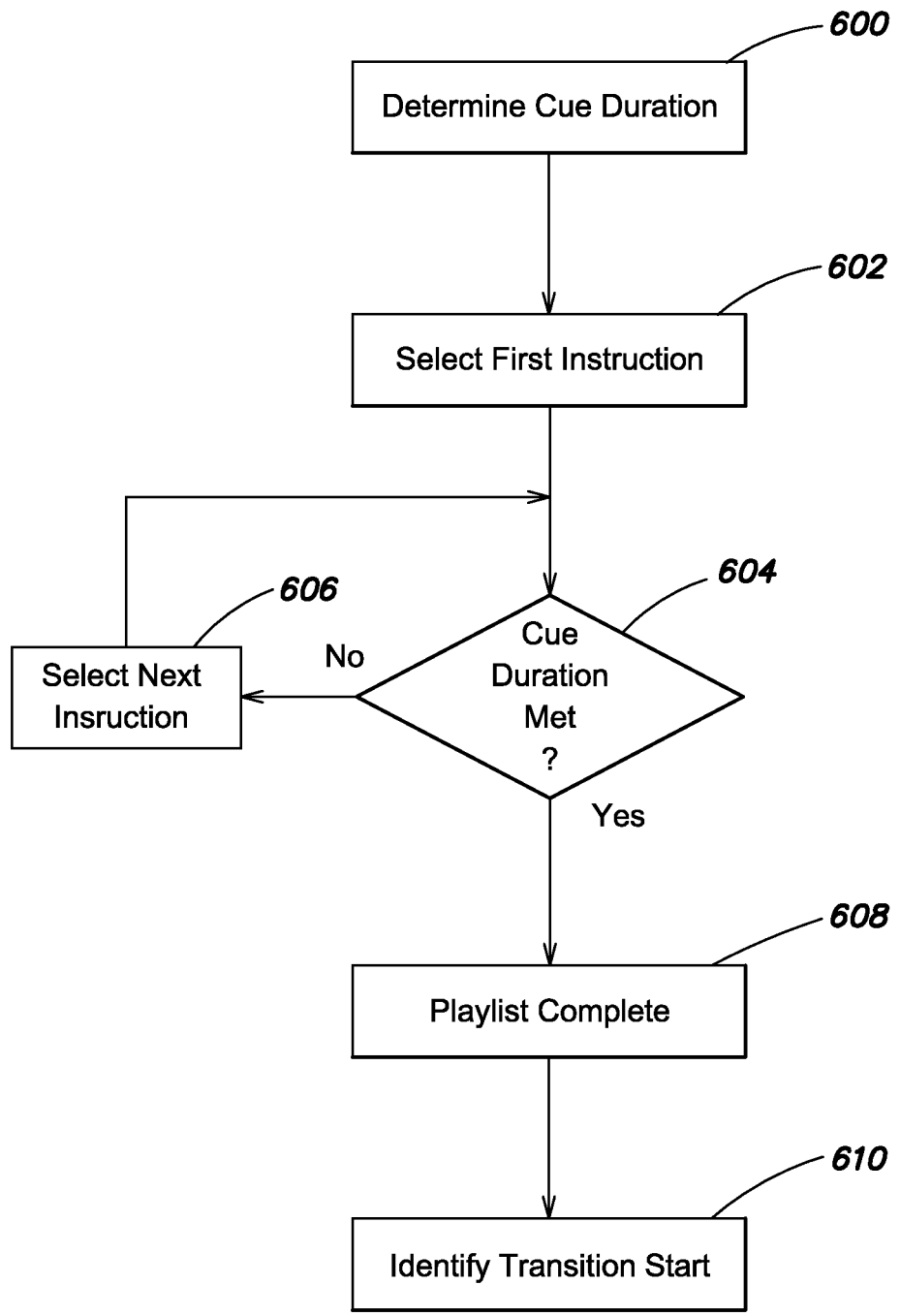
FIG. 6 is a flow chart describing how an audio cue file is used to create audio data of a desired duration.

Given the foregoing understanding of cue lists, the audio cues, and the interaction available with the electronic book reader, the dynamic audio player will now be described in more detail in connection with FIGS. 5-7.

To initiate playback when a book is first opened (500) by a reader, the electronic book reader calls 502 the "ebookOpenedwithUniqueID" function, indicating the book's unique identifier and whether the book had been opened before. The dynamic audio player receives 504 the identifier of the electronic book, and downloads or reads 506 the cue list for the identified book. The electronic book reader prompts the dynamic audio player for information about the cue list, by calling 508 the "getCueLists" function. The dynamic audio player sends 510 the cue list, which the electronic book reader presents to the user to select 512 one of the soundtracks (if there is more than one soundtrack) for the book. Such a selection could be enhanced by using a customer feedback rating system that allows users to rate soundtracks, and these ratings could be displayed to users when a selection of a soundtrack is requested by the system. The "cueListEnabled" function is then called 514 to inform the dynamic audio player of the selected cue list, which the dynamic audio player receives 516 through the function call. The "fetchSoundtrack" function is called 518 to instruct the dynamic audio player to fetch 520 the cues for playback.

After this setup process completes, the dynamic audio player has the starting cue and the cue list, and thus the current cue, for initiating playback. Playback can be started at about the time this portion of the electronic book is displayed by the electronic book reader. The dynamic player then determines, based on the data about the user interaction with the book, the next cue to play, when to play the cue, and how to transition to the next cue from the current cue.

The dynamic audio player extends or shortens the playback time of a cue's audio stem files to fit the estimated total cue duration. This estimated cue duration can be computed in several ways. An example implementation uses an estimate of the reading speed, the computation of which is described in more detail below. The current cue duration is updated in response to the data that describes the user interaction with the electronic book reader, such as provided at every page turn through the "displayedPositionRangeChanged" function call.

In general, the playback time of a cue's audio stem files is modified by automatically looping sections of the audio stem files, varying the individual stem mixes and dynamically adding various effects such as reverb, delays and chorus. The loop points and other mix automation data specific to the audio stem files are stored in the cue file's metadata. There can be several different loop points in a cue file. The sections of the audio stems can be selected so that, when looped and remixed, they provide the most effective and interesting musical end user experience. This process avoids generating music that has obvious repetitions and maximizes the musical content to deliver a musically pleasing result that can have a duration many times that of the original piece(s) of audio. When the next cue is triggered, the transition between the outgoing and the incoming audio is also managed by the same process, using the cue file metadata to define the style and placement of an appropriate cross fade to create a seamless musical transition.

As an example, assume a cue file contains four audio stems (a melody track, a sustained chordal or "pad" track, a rhythmic percussive (often drums) track and a rhythmic harmonic track) that would run for 4 minutes if played in a single pass. Further assume that this recording has 3 distinct sections, A, B and C. The meta information in the cue file will include:

1. how to transition into the cue from a previous cue. This includes transition style (i.e., slow, medium or quick fade-in, or stop previous cue with reverb tail and start new cue from beginning of cue), musical bar and beat markers so that the cross fade will be musically seamless;

2. The time positions where each of the A, B and C sections can be looped.

3. The cue producer's input on how the 4 stems can be remixed. E.g., play stems 1, 2 and 3 only using section A, then play stems 1, 3 and 4 only using section A, add reverb to stem 3 and play it on its own using section B, then play stems 3 and 4 from section B, etc. Having these kinds of instructions means that a typical four minute piece of audio can be extended up to 40 or more minutes without obvious repetition. In addition, each mix is unique for the user and is created at the time of playback so unauthorized copying of the soundtrack is more difficult.

As an example, referring now to FIG. 6, this process will be described in more detail. Given a cue and a starting point, the duration of time until the next cue is to be played is determined (600). An example way to compute this duration is provided in more detail below. Given the duration, the cue producer's input is processed to produce a playlist of the desired duration. In other words, the first instruction in the remix information is selected 602 and added to playlist. If this section of the audio stems has a duration less than the desired duration, determined at 604, then the next instruction is selected 606, and the process repeats until a playlist of the desired duration is completed 608. At the end of the cue, the transition information in the metadata for the next cue is used to select 610 a starting point in the current playlist to implement a cross-fade from the current cue to the next cue.

One way to estimate the duration of a cue is to estimate the reading speed of the reader (in words per minute) and, given the number of words in the cue, determine how much time the reader is likely to take to complete reading this portion of the book. This estimate can be computed from a history of reading speed information for the reader.

When the user starts reading a book, an initial reading speed of a certain number words per minute is assumed. This initial speed can be calculated from a variety of data about a user's previous reading speed history from reading previous books, which can be organized by author, by genre, by time of day, by location, and across all books. If no previous reading history is available, then an anonymous global tally of how other users have read this title can be used. If no other history is available a typical average of 400 words per minute is used.

Figure 7:
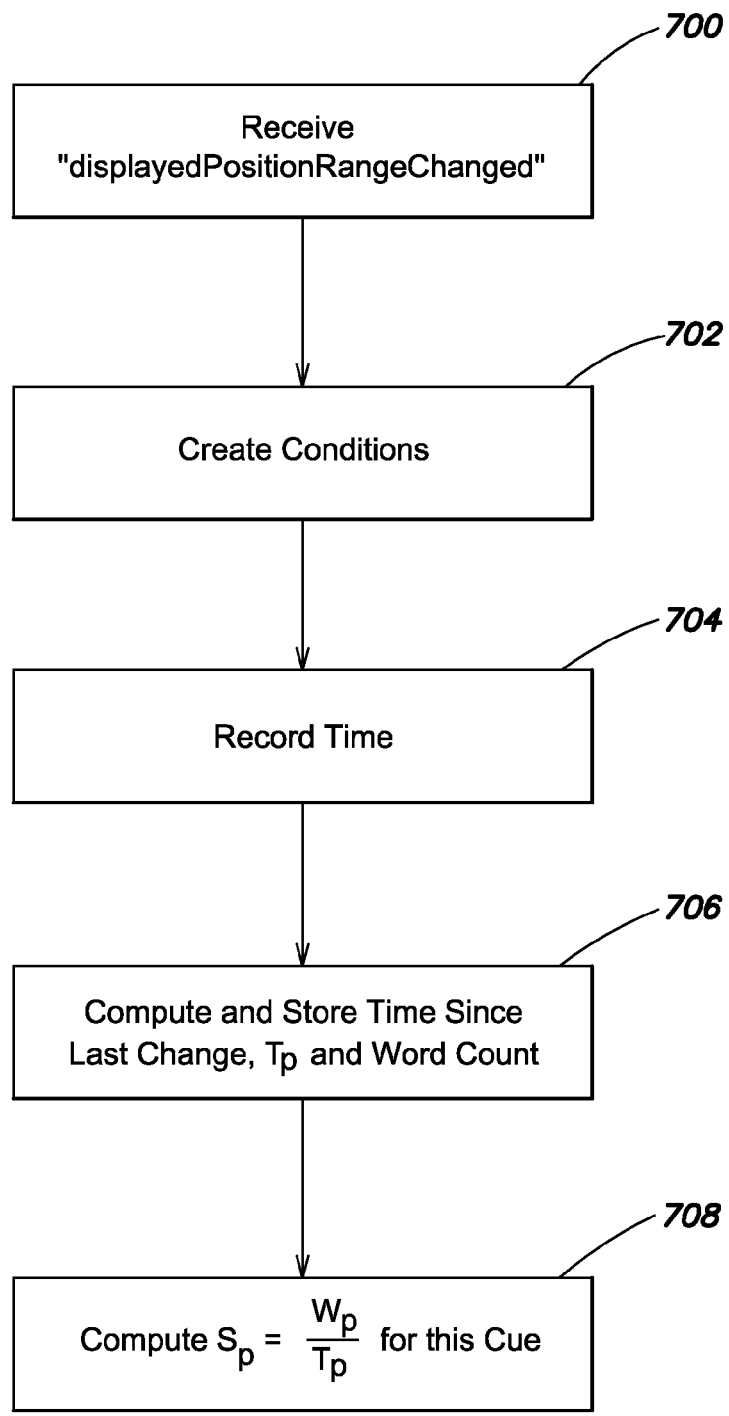
FIG. 7 is a flow chart describing how reading speed is calculated.

Referring now to FIG. 7, the reading speed for the user is tracked each time the displayed position range is changed, as indicated by the "displayedPositionRangeChanged" function call. If this function call is received (700), then several conditions are checked 702. These conditions can include, but are not limited to nor are all required: the user is actively reading, i.e., not in the reading paused state; the new displayed position range is greater than the previously displayed position range; the start of the newly displayed position range touches the end of the previously displayed position range; and the word count is above a minimum amount (currently 150 words). The time since the last change also should be within a sensible range, such as the standard deviation of the average reading speed to check the speed is within the normal expected variance. If these conditions are met, then the current time is recorded 704. The time since the last change to the displayed position range is computed and stored 706, together with the word count for the previously displayed position range. The reading speed for this section is computed 708. From this historic data of measured reading speeds, an average reading speed can be computed and used to estimate cue durations.

The formula for calculating the reading speed Sp (in words per second) for a page p is:

$$S_p = \frac{W_p}{T_p}$$

where Wp is the word count for the page and Tp is the time taken to read the page, in seconds. In one implementation, the statistic used for the average reading speed is a 20 period exponential moving average (EMA), which smoothes out fluctuations in speed, while still considering recent page speeds more important.

The formula for calculating the EMA is:

$$M_0 = S_0$$
$$M_p = \frac{n-1}{n+1} \times M_{p-1} + \frac{2}{n+1} \times S_p$$

Where n is the number of periods, i.e., 20.

To calculate the variance in reading speeds we use Welford's method for calculating Variance, over the last 20 values:

Initialize $M_1 = T_1$ and $S_1 = 0$

For subsequent values of T, use the recurrence formulas $$M_k = M_{k-1} + \frac{T_k - M_{k-1}}{k}$$
$$S_k = S_{k-1} + (T_k - M_{k-1}) \times (T_k - M_k)$$

For $\leq k \leq n$ the $k^{th}$ estimate of the variance is:

$$s^2 = \frac{S_k}{k-1}.$$

This reading speed information can be stored locally on the user's electronic book reader application platform. Such information for multiple users can be compiled and stored on a server in an anonymous fashion. The application could look up reading speed information statistics to determine how fast others have read a work or portions of a work.

Other types of user interaction instead of or in addition to reading speed can be used to control playback.

In one implementation, the data about the user interaction with the electronic book indicates that the reader has started reading from a point within the book. This happens often, as a reader generally does not read a book from start to finish in one sitting. In some cases, when a reader restarts reading at a point within the book, the audio level, or other level of "excitement," of the audio in the soundtrack at that point might not be appropriate. That is, the audio could actually be distracting at that point. The dynamic audio player can use an indication that the reader has started reading from a position within the book as an opportunity to select an alternative audio cue from the audio cue that has been selected for the portion of the book that includes the current reading position.

As another example, the reader may be reading the book by skipping around from section to section. Other multimedia works may encourage such a manner of reading. In such a case, the audio cue associated with a section of a work is played when display of that section is initiated. A brief cross-fade from the audio of the previously displayed section to the audio for the newly displayed section can be performed. In some applications, where the nature of the work is such that the viewing time of any particular section is hard to predict, the dynamic playback engine can simply presume that the duration is indefinite and it can continue to generate audio based on the instructions in the cue file until an instruction is received to start another audio cue.

As another example, it is possible to use the audio cue files to playback different sections of a cue file in response to user inputs. For example, popular songs could be divided into sections. A user interface could be provided for controlling audio playback that would instruct the player to jump to a next section or to a specified section in response to a user input.

Having now described how such works and accompanying soundtracks can be created, their distribution will now be discussed.

Creating a soundtrack for an electronic book involves associating audio files with portions of the text of the electronic book. There are several ways in which the soundtrack can be created.

In one implementation, a composer writes and records original music for each portion of the text. Each portion of the text can be associated with individual audio files that are so written and recorded. Alternatively, previously recorded music can be selected and associated directly with the portions of the text. In these implementations, the audio file is statically and directly assigned to portions of the text.

In another implementation, audio files are indirectly assigned to portions of the text. Tags, such as words or other labels, are associated with portions of the text. Such tags may be stored in a computer data file or database and associated with the electronic book, similar to the cue list described above. Corresponding tags also are associated with audio files. One or more composers write and record original music that is intended to evoke particular emotions or moods. Alternatively, previously recorded music can be selected. These audio files also are associated with such tags, and can be stored in a database. The tags associated with the portions of the text can be used to automatically select corresponding audio files with the same tags. In the event that multiple audio files are identified for a tag in the book, one of the audio files can be selected either by a computer or through human intervention. This implementation allows audio files to be collected in a database, and the creation of a soundtrack to be completed semi-automatically, by automating the process of selecting audio files given the tags associated with the electronic book and with audio files.

In an implementation where audio files are indirectly associated with the electronic book, the audio files also can be dynamically selected using the tags at a time closer to playback.

The process of associating tags with the electronic book also can be automated. In particular, the text can be processed by a computer to associate emotional descriptors to portions of the text based on a semantic analysis of the words of the text. Example techniques for such semantic analysis include, but are not limited to, those described in "Emotions from text: machine learning for text-based emotion prediction," by Cecilia Ovesdotter Alm et al., in Proceedings of Human Language Technology Conference and Conference on Empirical Methods in Natural Language Processing (October 2005), pp. 579-586, and which is hereby incorporated by reference. These tags can describe the emotional feeling or other sentiment that supports the section of the work being viewed. For example these emotional feelings can include, but are not limited to, medium tension, love interest, tension, jaunty, macho, dark, brooding, ghostly, happy, sad, wistful, sexy moments, bright and sunny.

Figure 8:
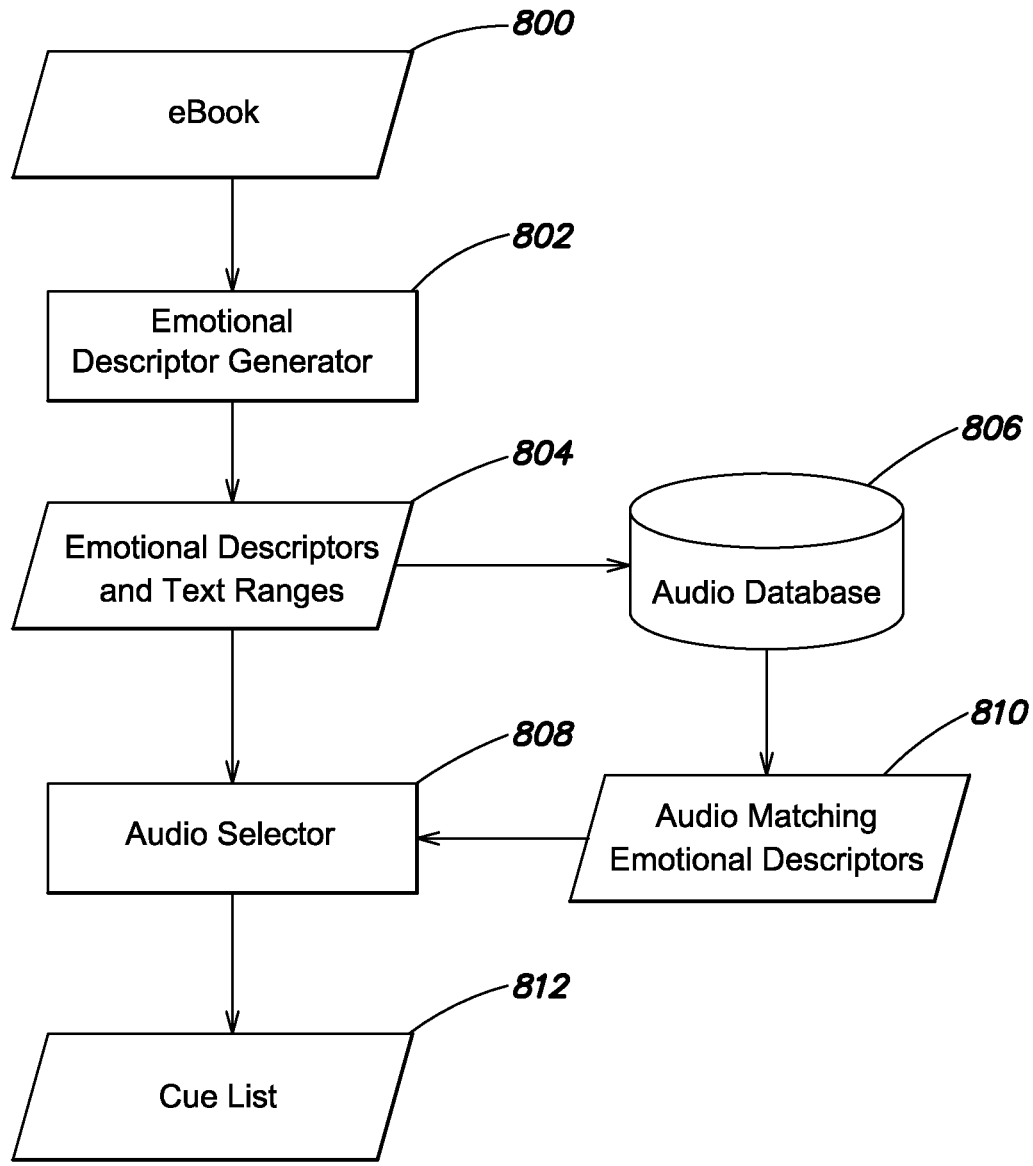
FIG. 8 is a data flow diagram describing how a soundtrack can be automatically generated for an electronic book.

FIG. 8 is a data flow diagram that illustrates an example of a fully automated process for creating a soundtrack for an electronic book, given audio files that have tags associated with them. An electronic book 800 is input to an emotional descriptor generator 802 that outputs the emotional descriptors and text ranges 804 for the book. The emotional descriptors are used to lookup, in an audio database 806, audio files 810 that match the emotional descriptors for each range in the book. The audio selector 808 allows for automated, random or semi-automated selection of an audio file for each text range to generate a cue list 812. A unique identifier can be generated for the electronic book and stored with the cue list 812.

Such electronic books and their soundtracks can be distributed in any of variety of ways, including but not limited to currently used ways for commercial distribution of electronic books. In one implementation, the electronic book and the electronic book reader are distributed to end users using conventional techniques. The distribution of the additional soundtrack and dynamic audio player is completed separately. The distribution of the soundtrack is generally completed in two steps: first the cue list is downloaded, and then each audio file is downloaded. The audio files can be downloaded on demand. The dynamic audio player can include a file manager that maintains information about available cue files that may be stored on the same device on which the electronic book reader operates, or that may be stored remotely.

In one implementation, the electronic book is distributed to end users along with the cue list and dynamic audio player.

In another implementation, the electronic book and its associated cue list are distributed together. The cue list is then used to download the audio files for the soundtrack as a background task. In one implementation, the electronic book is downloaded first and the download of the cue list is initiated as a background task, and then the first audio file for the first cue is immediately downloaded.

In another implementation, the electronic book reader is a device with local storage that includes local generic cues, having a variety of emotional descriptors that can be selected for a playback in accordance with the cue list. These generic cues would allow playback of audio if a remote audio file became unavailable.

In one implementation, the electronic book reader application is loaded on a platform that has access to a network, such as the interne, through which it can communicate with a distributor of electronic media. Such a distributor may receive a request to purchase and/or download electronic media from users. After receiving the request, the distributor may retrieve the requested work and its accompanying soundtrack information from a database. The retrieved electronic media can be encrypted and sent to the user of the electronic book reader application. The electronic media may be encrypted such that the electronic media may be played only on a single electronic book reader. Typically, the digital rights management information associated with the work also is applied to the soundtrack information.

In the foregoing, a storage medium may represent one or more devices for storing data, including read-only memory (ROM), random access memory (RAM), magnetic disk storage mediums, optical storage mediums, flash memory devices and/or other machine readable mediums for storing information. The terms "machine readable medium" and "computer readable medium" include, but are not limited to portable or fixed storage devices, optical storage devices, and/or various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, circuit, and/or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

One or more of the components and functions illustrated the figures may be rearranged and/or combined into a single component or embodied in several components without departing from the invention. Additional elements or components may also be added without departing from the invention. Additionally, the features described herein may be implemented in software, hardware, as a business method, and/or combination thereof.

While certain exemplary embodiments have been described and shown in the accompanying drawings, it is to be understood that such embodiments are merely illustrative of and not restrictive on the broad invention, having been presented by way of example only, and that this invention is not be limited to the specific constructions and arrangements shown and described, since various other modifications may occur to those ordinarily skilled in the art.

What is claimed is:

1. A computer-implemented process for dynamic playback of audio, comprising:
   receiving data about user interaction with a portion of an electronic visual work;
   dynamically adjusting a duration of playback of audio associated with the portion of the electronic visual work according to the user interaction;
   estimating a duration for visual display of the portion of the electronic visual work according to the received data about user interaction with the portion of the electronic visual work, wherein the duration is estimated using a history of reading speeds; and
   selecting a sequence of mixes of stems of audio associated with the portion of the electronic visual work so as to provide audio with the estimated duration.

2. The computer-implemented process of claim 1, further comprising:
   identifying tags associated with the portion of the electronic visual work;
   selecting the audio to be associated with the portion of the electronic visual work based upon the tags associated with the portion of the electronic visual work.

3. The computer-implemented process of claim 2, wherein tags are associated with the audio to be associated with the portion of the electronic visual work, and the selection of audio is based upon a comparison of the tags associated with the audio and the tags associated with the portion of the electronic visual work.

4. The computer-implemented process of claim 2, wherein the tags comprise emotional descriptors.

5. The computer-implemented process of claim 1, wherein the data about user interaction comprises information about changes to a current position in the electronic visual work.

6. The computer-implemented process of claim 1, wherein the data about user interaction comprises information about a word count for a currently-displayed portion of the electronic visual work.

7. The computer-implemented process of claim 1, wherein the data about user interaction comprises information about whether the electronic visual work has been resumed from a state of inactivity.

8. The computer-implemented process of claim 1, wherein the history of reading speeds comprises one history of a plurality of reading speed histories, wherein each of the reading speed histories is associated with one user of a plurality of users.

9. The computer-implemented process of claim 1, wherein the stems of audio comprise separate audio files.

10. The computer-implemented process of claim 1, wherein selecting a sequence of mixes of stems of audio comprises looping sections of the stems of audio.

11. A computer-readable storage medium that tangibly stores instructions for dynamic playback of audio, which when executed by one or more processors, cause:
    receiving data about user interaction with a portion of an electronic visual work; and
    dynamically adjusting a duration of playback of audio associated with the portion of the electronic visual work according to the user interaction;
    estimating a duration for visual display of the portion of the electronic visual work according to the received data about user interaction with the portion of the electronic visual work, wherein the duration is estimated using a history of reading speeds; and
    selecting a sequence of mixes of stems of audio associated with the portion of the electronic visual work so as to provide audio with the estimated duration.

12. The computer-readable storage medium of claim 11, wherein the instructions, which when executed by one or more processors, further cause:
    identifying tags associated with the portion of the electronic visual work;
    selecting the audio to be associated with the portion of the electronic visual work based upon the tags associated with the portion of the electronic visual work.

13. The computer-readable storage medium of claim 12, wherein tags are associated with the audio to be associated with the portion of the electronic visual work, and the selection of audio is based upon a comparison of the tags associated with the audio and the tags associated with the portion of the electronic visual work.

14. The computer-readable storage medium of claim 12, wherein the tags comprise emotional descriptors.

15. The computer-readable storage medium of claim 11, wherein the data about user interaction comprises information about changes to a current position in the electronic visual work.

16. The computer-readable storage medium of claim 11, wherein the data about user interaction comprises information about a word count for a currently-displayed portion of the electronic visual work.

17. The computer-readable storage medium of claim 11, wherein the data about user interaction comprises information about whether the electronic visual work has been resumed from a state of inactivity.

18. The computer-readable storage medium of claim 11, wherein the history of reading speeds comprises one history of a plurality of reading speed histories, wherein each of the reading speed histories is associated with one user of a plurality of users.

19. The computer-readable storage medium of claim 11, wherein the stems of audio comprise separate audio files.

20. The computer-readable storage medium of claim 11, wherein selecting a sequence of mixes of stems of audio comprises looping sections of the stems of audio.

21. A hardware device that performs dynamic playback of audio, comprising:
    one or more processors; and
    one or more computer-readable storage mediums storing one or more sequences of instructions, which when executed by the one or more processors, cause:
    receiving data about user interaction with a portion of an electronic visual work; and
    dynamically adjusting a duration of playback of audio associated with the portion of the electronic visual work according to the user interaction;
    estimating a duration for visual display of the portion of the electronic visual work according to the received data about user interaction with the portion of the electronic visual work, wherein the duration is estimated using a history of reading speeds; and
    selecting a sequence of mixes of stems of audio associated with the portion of the electronic visual work so as to provide audio with the estimated duration.

22. The computer-readable storage medium of claim 21, wherein the instructions, which when executed by one or more processors, further cause:
    identifying tags associated with the portion of the electronic visual work;
    selecting the audio to be associated with the portion of the electronic visual work based upon the tags associated with the portion of the electronic visual work.

23. The computer-readable storage medium of claim 22, wherein tags are associated with the audio to be associated with the portion of the electronic visual work, and the selection of audio is based upon a comparison of the tags associated with the audio and the tags associated with the portion of the electronic visual work.

24. The computer-readable storage medium of claim 22, wherein the tags comprise emotional descriptors.

25. The computer-readable storage medium of claim 21, wherein the data about user interaction comprises information about changes to a current position in the electronic visual work.

26. The computer-readable storage medium of claim 21, wherein the data about user interaction comprises information about a word count for a currently-displayed portion of the electronic visual work.

27. The computer-readable storage medium of claim 21, wherein the data about user interaction comprises information about whether the electronic visual work has been resumed from a state of inactivity.

28. The computer-readable storage medium of claim 21, wherein the history of reading speeds comprises one history of a plurality of reading speed histories, wherein each of the reading speed histories is associated with one user of a plurality of users.

29. The computer-readable storage medium of claim 21, wherein the stems of audio comprise separate audio files.

30. The computer-readable storage medium of claim 21, wherein selecting a sequence of mixes of stems of audio comprises looping sections of the stems of audio.

\* \* \* \* \*